US012036691B2

(12) United States Patent
Skidmore

(10) Patent No.: US 12,036,691 B2
(45) Date of Patent: Jul. 16, 2024

(54) DRYWALL PUNCH

(71) Applicant: Stephen Skidmore, Emmaus, PA (US)

(72) Inventor: Stephen Skidmore, Emmaus, PA (US)

( * ) Notice: Subject to any disclaimer, the term of this patent is extended or adjusted under 35 U.S.C. 154(b) by 332 days.

(21) Appl. No.: 17/676,327

(22) Filed: Feb. 21, 2022

(65) Prior Publication Data

US 2022/0266469 A1 Aug. 25, 2022

Related U.S. Application Data

(60) Provisional application No. 63/151,775, filed on Feb. 21, 2021.

(51) Int. Cl.
*B26F 1/32* (2006.01)
*E04G 23/08* (2006.01)

(52) U.S. Cl.
CPC ................ *B26F 1/32* (2013.01); *E04G 23/08* (2013.01)

(58) Field of Classification Search
CPC .................................... B26F 1/32; E04G 23/08
USPC ............................................................. 30/367
See application file for complete search history.

(56) References Cited

U.S. PATENT DOCUMENTS

| | | | | | |
|---|---|---|---|---|---|
| 640,696 | A * | 1/1900 | Pearl | B26F 1/32 | 30/368 |
| 1,589,127 | A * | 6/1926 | Deveault | B26F 1/32 | 30/358 |
| 4,335,511 | A * | 6/1982 | Bowling | E04F 21/00 | 30/367 |
| 4,924,576 | A * | 5/1990 | Schiller | C14B 19/00 | 30/367 |
| 6,747,536 | B1 * | 6/2004 | Miller, Jr. | G01V 3/15 | 324/67 |
| 7,509,721 | B1 * | 3/2009 | Liang | B26D 5/08 | 29/249 |
| 9,134,447 | B1 * | 9/2015 | Tin | B25G 1/00 | |
| 9,329,295 | B1 * | 5/2016 | Blake | G01V 3/08 | |
| 2002/0046633 | A1 * | 4/2002 | Borowczak | B26F 1/32 | 83/13 |
| 2006/0236552 | A1 * | 10/2006 | Giles | B67B 7/20 | 30/367 |
| 2011/0271533 | A1 * | 11/2011 | Lien | B26F 1/32 | 30/366 |
| 2017/0028572 | A1 * | 2/2017 | Raymond | B43L 9/04 | |
| 2017/0144323 | A1 * | 5/2017 | Hare | B26F 1/32 | |

* cited by examiner

*Primary Examiner* — Sean M Michalski
*Assistant Examiner* — Robert D Cornett
(74) *Attorney, Agent, or Firm* — Sanford J. Piltch

(57) ABSTRACT

The drywall punch, a drywall removal device, is a handheld tool used to punch through drywall by being positioned over each drywall fastener to penetrate through the drywall sheet surface and crush the drywall sheet material beneath detaching the drywall from the fastener and from the underlying supporting structure.

6 Claims, 6 Drawing Sheets

DRYWALL PUNCH

BACKGROUND OF THE INVENTION

Drywall, also known as Sheetrock, Wallboard or Gypsum Board, is often used as an interior wall material in residential and commercial construction. Drywall is supplied in thin sheets which are fastened to a wall or ceiling structure with fasteners at regular intervals as specified by regional norms. The fasteners capture the drywall and compress the drywall between the head of the fastener and the supporting wall structure. The drywall is then structurally connected to the wall structure.

Typically, drywall removal is accomplished by prying and breaking the drywall away from the wall or ceiling structure. The fasteners resist the prying of the drywall from the wall structure, prying forces are increased to cause the drywall to break into pieces. The prying and breaking require significant force with the potential for injuries to workers and damage to nearby pipes, wires or other utilities that may be inside or on the wall. Breaking the drywall also generates significant debris and dust. There is a need for a tool that enables drywall to be removed with less effort, less risk to workers and nearby structures, and in generating less debris and dust.

SUMMARY OF THE INVENTION

The present invention seeks to provide a device and method to remove drywall with less effort, less risk to workers and nearby structures and generating less debris and dust by locating the fasteners securing a sheet of drywall to the wall structure and then separating the fasteners from the drywall by a user.

A first embodiment of the drywall removal tool of the present invention is comprised of a hollow thin wall cylinder that houses a compressible spring having proximal and distal ends. The spring is press fit to a striking cap that is, in turn, press fit into the proximal end of the thin wall cylinder. A non-magnetic holder for retaining a cylindrical magnet within one exposed face of the holder is press fit into the distal end of the spring. The length dimensions of the thin wall cylinder, the striking cap, the spring, the non-magnetic holder and the magnet, in the aggregate, are such that the striking cap extends outward from the proximal end of the thin wall cylinder and the non-magnetic holder and the magnet fit flush to the distal end of the thin wall cylinder with the spring fitting entirely within the thin wall cylinder.

The magnet is capable of detecting drywall fasteners beneath the drywall sheet outer surface so as to provide a point for striking the drywall sheet to release the drywall sheet from the fastener. A user can move the drywall punch over the surface of the drywall sheet to locate the underlying drywall fasteners to pinpoint location for striking the drywall sheet for removal from the fasteners. The spring, non-magnetic holder and magnet are capable of retraction into the thin wall tube when the striking cap is struck by an external force, such as a hammer, exposing the distal end or rim of the thin wall cylinder for use in penetrating the drywall sheet at the detected point of fastening said sheet to a structural support in order to separate the drywall sheet from the fastener and underlying drywall sheet material. The thin wall cylinder rim penetrates through the drywall sheet outer covering, crushing the underlying drywall sheet material, and creating a hole in the drywall sheet for subsequent removal of the drywall sheet from the fasteners remaining in the structural supports.

The drywall punch further comprises a gripping member having proximal and distal ends for manual manipulation of the drywall punch. The thin wall cylinder and striking cap are surrounded by and press fit into the gripping member such that the striking cap extends slightly outward of the proximal end of the gripping member and the thin wall cylinder extends outward from the distal end of the gripping member. A strike guard may be added at the proximal end of the drywall punch for preventing a user's hand from being struck by a hammer applying the external force to the drywall punch.

In a second embodiment of the drywall punch a different gripping member is substituted for the gripping member surrounding the striking cap and thin wall cylinder. The second gripping member is attached in a perpendicular arrangement to the external wall of the striking cap such that the combination drywall punch and gripping member may be used as a handle to hold the drywall punch in position over the location of a drywall fastener or in a striking fashion similar to a hammer. Further, alternate structures for retaining the spring in position within the thin wall tube by a press fit around the striking cap or being press fit within the gripping member.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
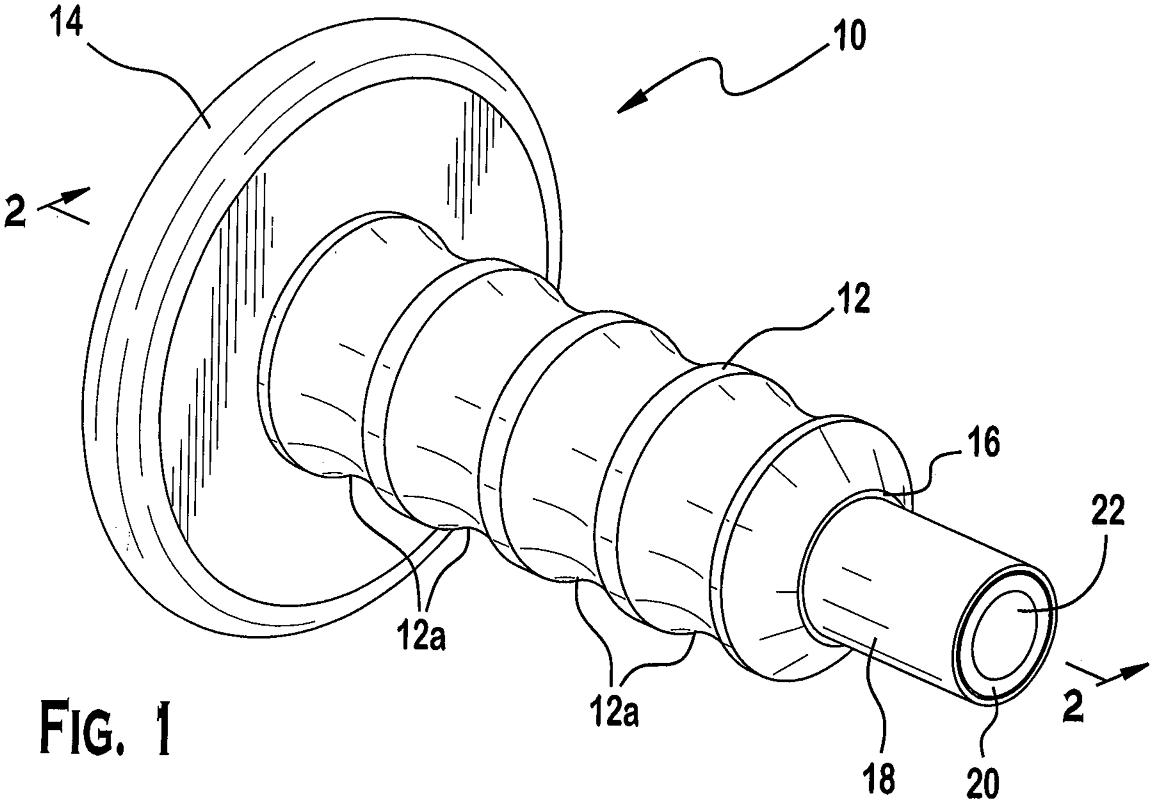
FIG. 1 is a perspective view of a first embodiment of the drywall punch of the present invention.
Figure 2:
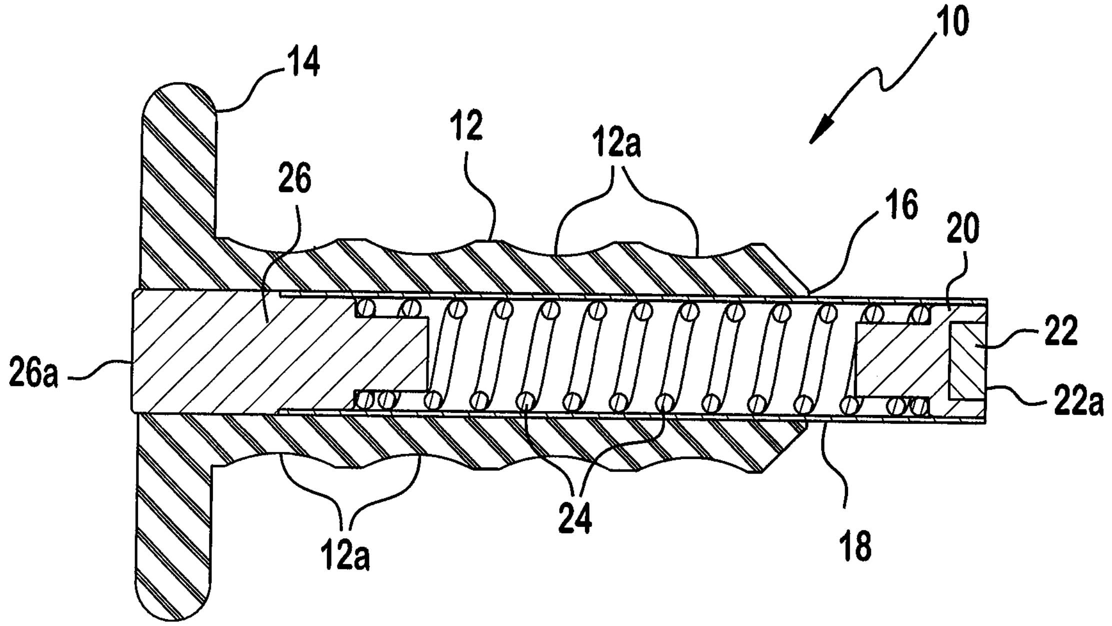
FIG. 2 is a cross-sectional view of the first embodiment of the drywall punch of the present invention.

The drywall punch 10, or drywall removal apparatus, is a hand held tool utilized to fracture and cut through the outer sheathing of the drywall at a plurality of fastening points permitting the drywall to be removed relatively intact leaving pieces of drywall at or surrounding the fasteners remaining on the drywall supporting members. Referring now to FIGS. 1, 2, there is shown a drywall punch 10 having a gripping member 12 terminated at its proximal end with a strike guard 14 and at its distal end an aperture 16 sized to accommodate and retain a thin wall tube 18. Housed within the thin wall tube 18 a non-magnetic holder 20 for retaining a magnet 22 within the thin wall tube 18. Holding the non-magnetic holder 20 within the thin wall tube 18 is a spring 24, shown as a coil-type spring, that is compressible to allow the non-magnetic holder 20 and magnet 22 to be pushed inward into the thin wall tube 18 and then return to its rest point with the outer surface 22*a* of the magnet 22 flush with the distal end or rim of the thin wall tube 18. The non-magnetic holder 20 is press fit into the distal end of spring 24 so that the non-magnetic holder 20 and the spring 24 move together as a unit.

The proximal end of the spring 24 is press fit onto a striking cap 26 which is press fit into the proximal end of the thin wall tube 18 so that when the striking cap 26 is struck the thin wall tube 18, spring 24, non-magnetic holder 20 and magnet 22 react together as a single unit. The striking cap 26 is fitted within the proximal end of the gripping member 12 with the striking cap 26 extending just slightly outward from the strike guard 14 at the proximal end of the gripping member 12 creating a strike point 26*a*. In this version of the drywall punch 10 the gripping member 12 may have a series of depressions 12*a* to promote an easier manual grip by the fingers and hand of a user.

Figure 3:
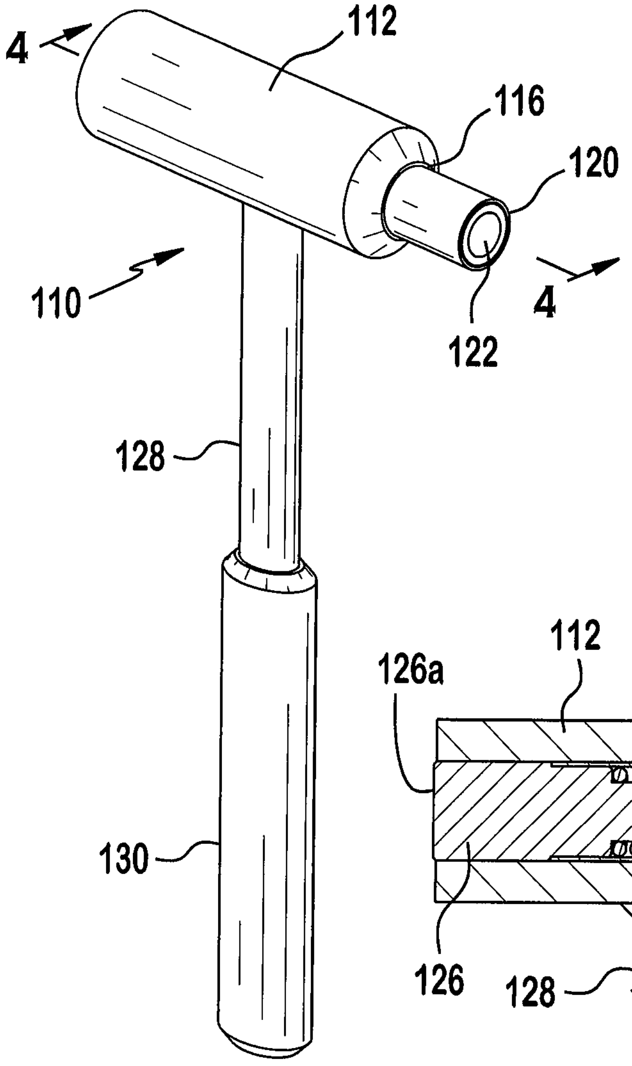
FIG. 3 is a perspective view of a second embodiment of the drywall punch of the present invention.
Figure 4:
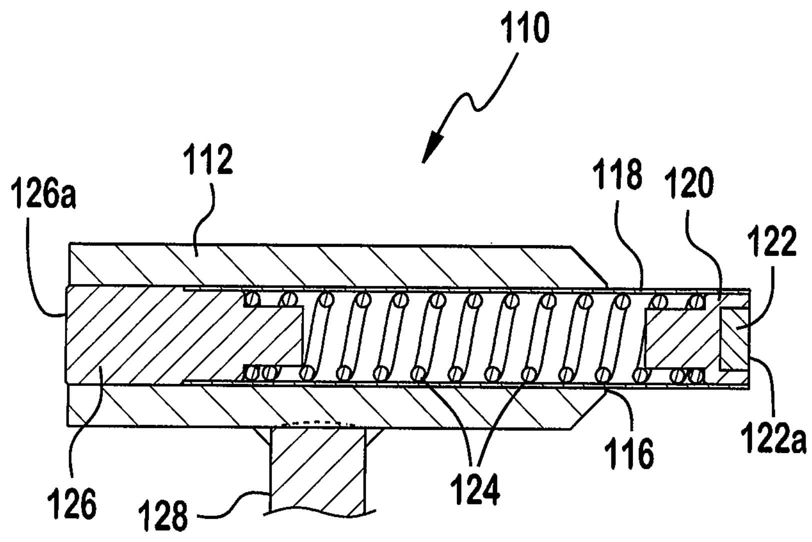
FIG. 4 is a cross-sectional view of the second embodiment of the drywall punch of the present invention.
Figure 5:
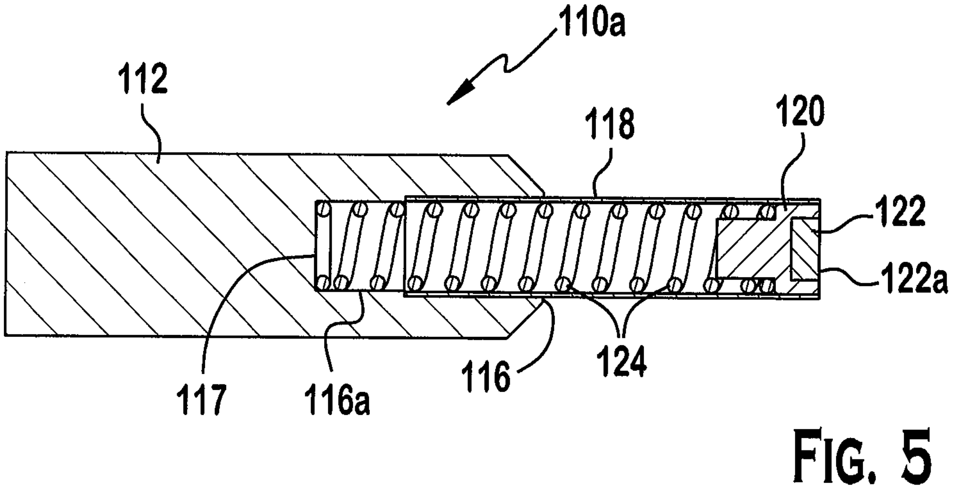
FIG. 5 is a cross-sectional view of an alternate structure of the second embodiment of the drywall punch of the present invention.

Referring to FIGS. 3-5, a second embodiment of the drywall punch 110 is shown having a gripping member 112 and at its distal end an aperture 116 sized to accommodate and retain a thin wall tube 118. Housed within the thin wall tube 118 is a non-magnetic holder 120 for retaining a magnet 122 within the thin wall tube 118. Holding the non-magnetic holder 120 within the thin wall tube 118 is a spring 124, shown as a coil-type spring, that is compressible to allow the non-magnetic holder 120 and magnet 122 to be pushed inward into the thin wall tube 118 and then return to its rest point with the outer surface 122*a* of the magnet 122 flush with the distal end or rim of the thin wall tube 118. The non-magnetic holder 120 is press fit into the distal end of spring 124 so that the non-magnetic holder 120 and the spring 124 move together as a unit.

The proximal end of the spring 124 is press fit onto a striking cap 126 which is press fit into the proximal end of the thin wall tube 118 so that when the striking cap 126 is struck the thin wall tube 118, spring 124, non-magnetic holder 120 and magnet 122 react together as a single unit. The striking cap 126 is fitted within the proximal end of the gripping member 112 with the striking cap 126 extending just slightly outward from the proximal end of the gripping member 112 creating a strike point 126*a*. In this version of the drywall punch 110 the gripping member 112 is attached to a handle 128 having a handle gripping member 130 to promote an easier manual grip by a user.

An alternate version of the drywall punch 110 is shown in FIG. 5 as drywall punch 110*a*. In this embodiment the drywall punch 110*a* does not include a striking cap. Instead, the thin wall tube 118 and spring 124 are press fit into the gripping member 112. The spring 124 is positioned within and against the end wall 117 of a reduced diameter aperture 116*a* of the aperture 116. The thin wall tube 118 is press fit into the larger diameter aperture 116. As in the prior version, the handle 128 has a handle gripping member 130 to promote an easier manual grip by a user.

Figure 6:
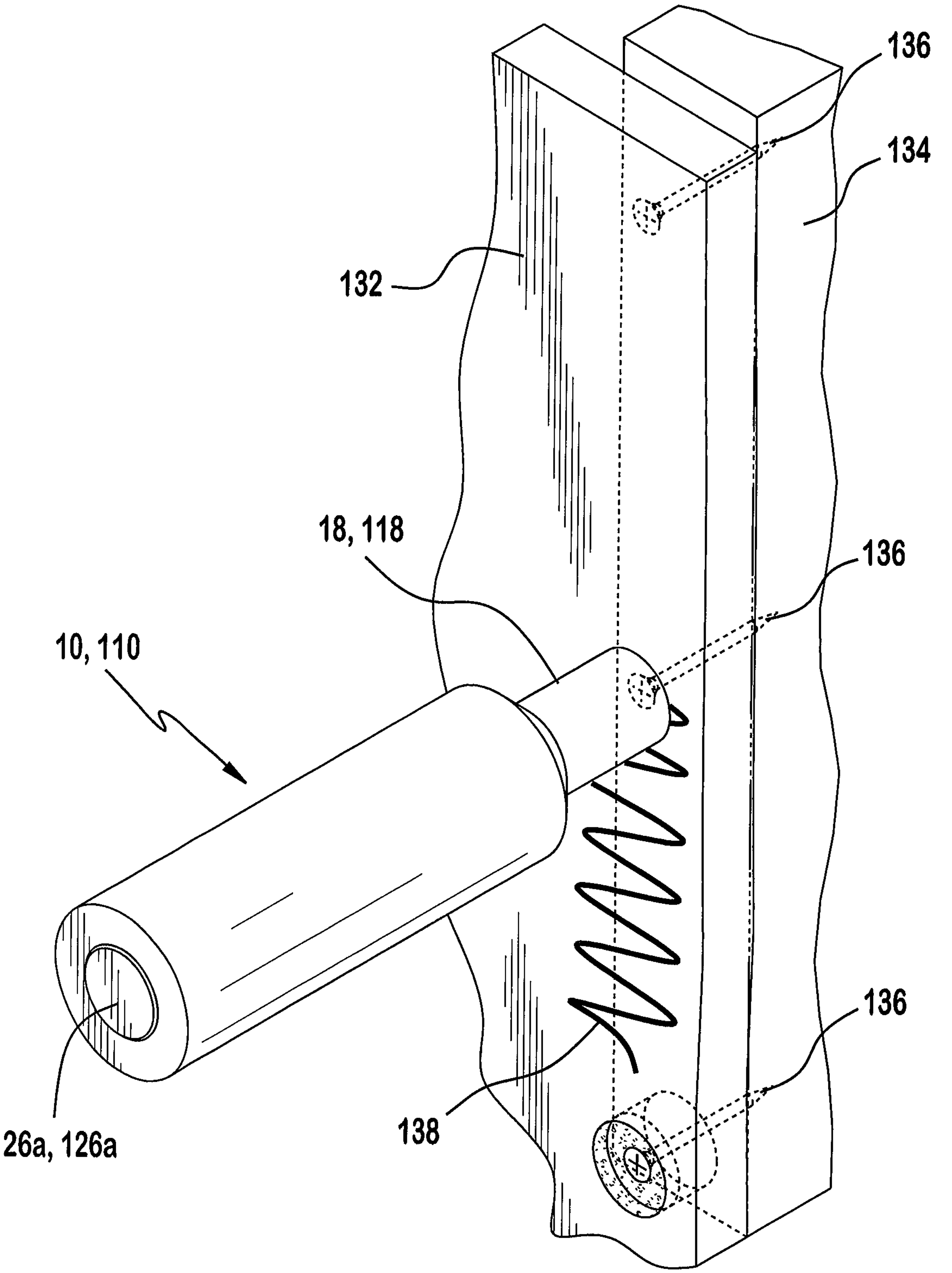
FIG. 6. is an enlarged perspective view of a drywall board fastened to the upright support stud of a wall with the drywall surrounding the lowest fastener punched, a track using the magnet of the drywall punch to locate the next higher fastener, and the drywall punch set to punch the located fastener within the drywall board.

Beginning with FIG. 6 the operational characteristics of the drywall punch 10, 110 will be described. FIG. 6. shows a drywall board 132 fastened to the upright support stud 134 of a wall within a structure by several screw fasteners 136. The drywall board 132 surrounding the lowest fastener 136 has already been located and punched causing a cutting of the drywall board surface 131 and a crushing of the board to be described more fully below. A track 138 is shown depicting the path of the drywall punch 10, 110 using the magnet 20, 120 to locate the next higher fastener 136 along the edge of the drywall board 132. Once found (as shown) the drywall punch 10, 110 is set to punch the located fastener 136 within the drywall board 132.

Figure 7:
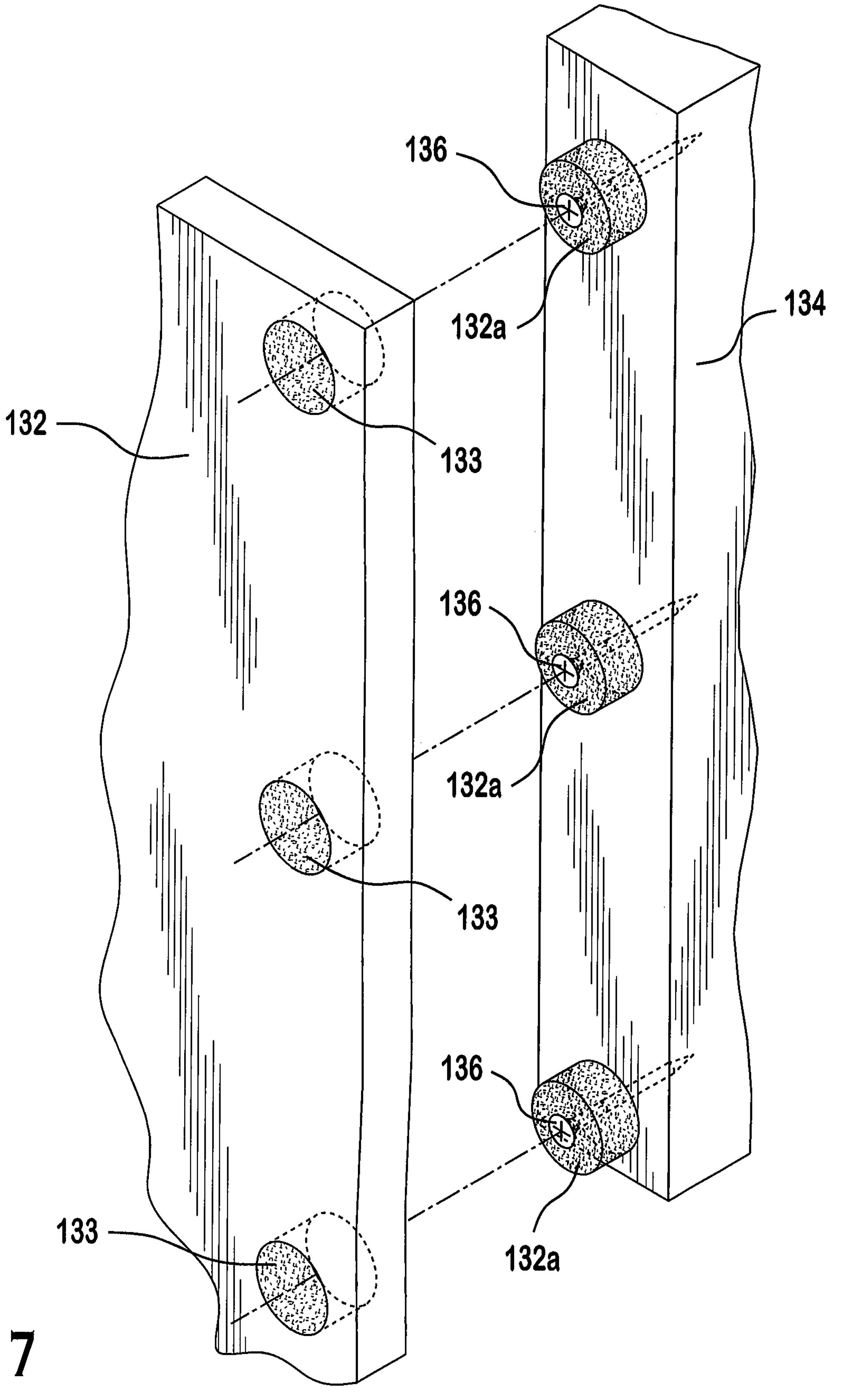
FIG. 7 is an enlarged perspective view of a drywall board with all located fasteners punched and the drywall board removed from the supporting upright stud.

Referring to FIG. 7, each of the three fasteners 136 have been located within the drywall board 132 and each location surrounding each of the fasteners 136 has been punched using the drywall punch 10, 110. The action of punching cuts the surface of the drywall board 132 with the rim of the thin wall tube 18, 118 causes a crushing effect of the drywall material beneath the rim of the thin wall tube 18, 118 as the magnet 22, 122 and the non-magnetic holder 20, 120 recede inward within the thin wall tube 18, 118 allowing for the penetration of the surface 131 of the drywall board 132 by the rim of the thin wall tube 18, 118. The repeated punching action for each of the fasteners 136 results in the same number of corresponding holes 133 in the drywall board 132 and allows the drywall board to be removed from its position secured to the support stud 134 leaving the remnants of the drywall board 132*a* and the fasteners 136 in place for later removal as necessary. The drywall board 132 is removed substantially intact so as to create fewer pieces of debris and waste drywall board for later removal.

Figure 8:
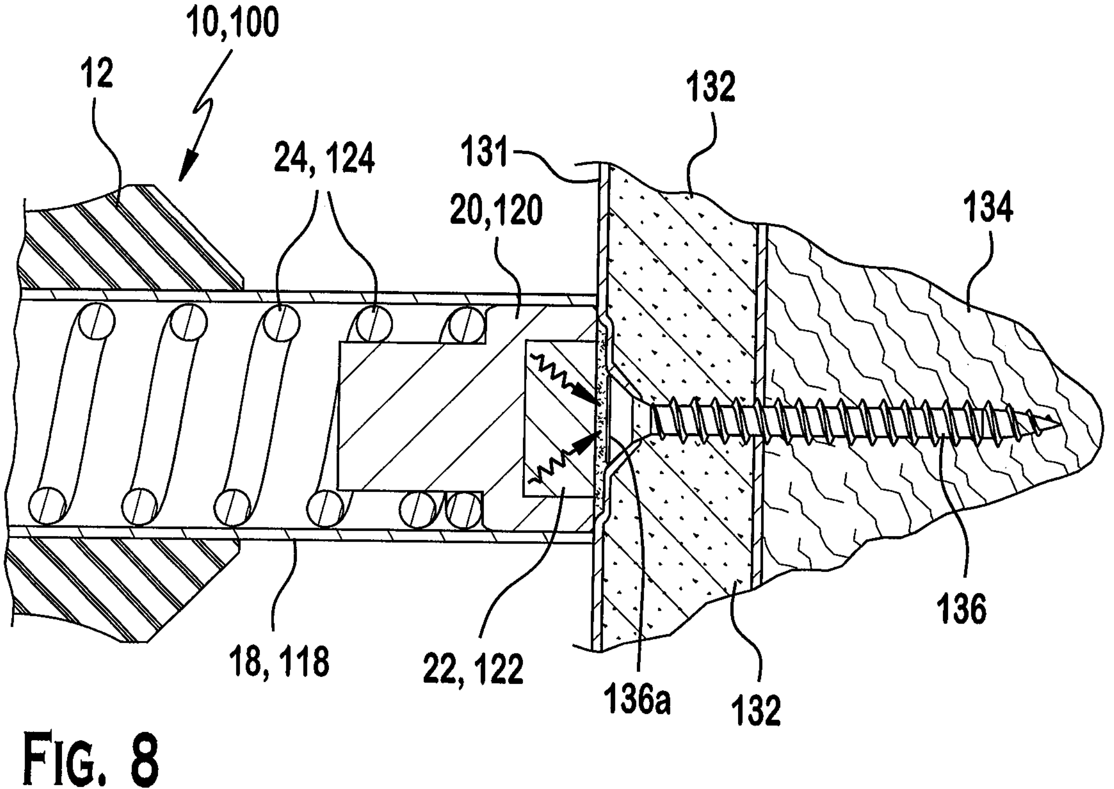
FIG. 8 is a cross-sectional view of the drywall punch of the present invention locating a drywall fastener within the board.
Figure 9:
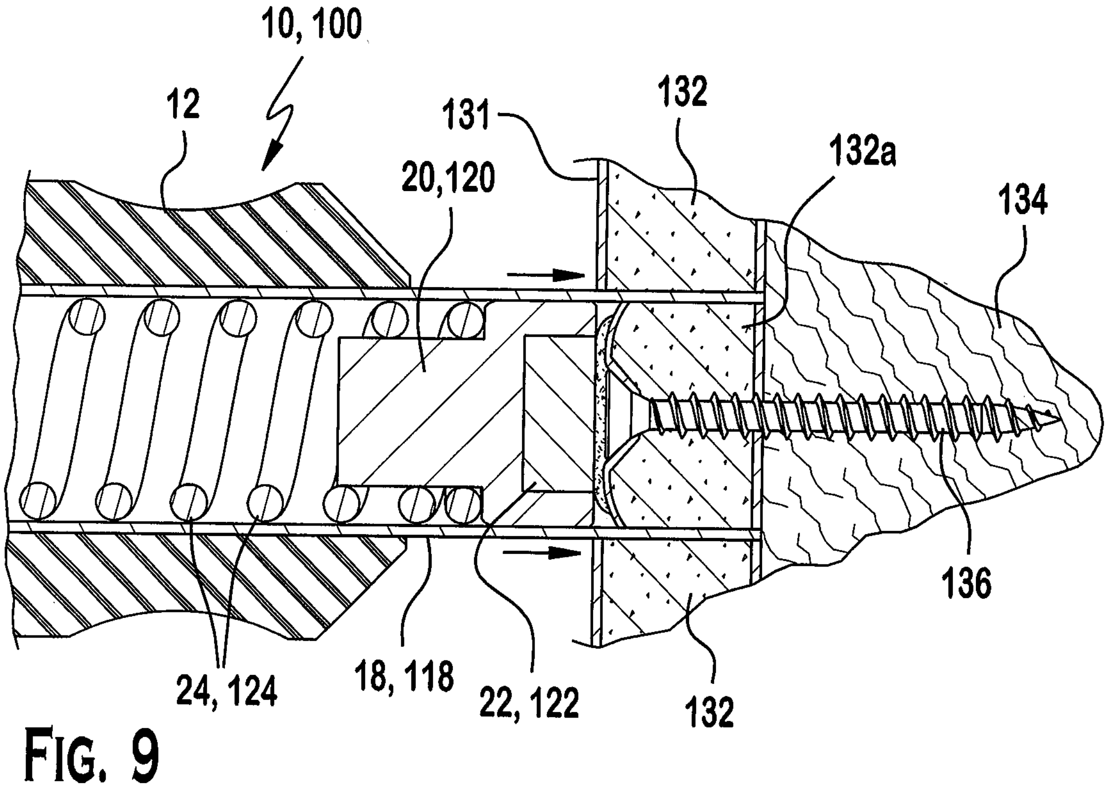
FIG. 9 is a cross-sectional view of the drywall punch of the present invention punching through the drywall board to separate the drywall board from that portion of the drywall board located behind the located fastener.

FIGS. 8-11 show the sequence of actions of the drywall punch 10, 110 locating and creating the cutting of the surface 131 of the drywall board 132 and crushing of the remainder of the drywall board 132 to affect the removal of the drywall board 132 substantially intact with the least amount of debris and waste material. In FIG. 8, the drywall punch 10, 110 is used to locate a drywall fastener 136 using the magnet 20, 120. Once located, the drywall punch 10, 110 is positioned over the drywall fastener 136 so as to cause the thin wall tube 18, 118 to surround the outward face 136*a* of the drywall fastener 136. Once in the correct position over a fastener 136, as shown in FIG. 8, the strike point 26*a*, 126*a* of the striking cap 26, 126 of the drywall punch 10, 110 is struck causing the magnet 22, 122 and the non-magnetic holder 20, 120 to recede into the thin wall tube 18, 118 causing the spring 24, 124 to compress inward as the distal end, i.e., the rim of the thin wall tube 18, 118 penetrates into the drywall board 132 as shown in FIG. 9. Striking the drywall punch 10, 110 causes the rim of the thin wall tube 18, 118 to penetrate (direction of solid arrows) through the drywall board surface 131 resulting in a crushing action of the drywall board material underneath the rim of the thin wall tube 18, 118. FIG. 9 shows a clean cut, but the reality of the crushing action of the drywall board material may not result in as clean a cut as shown, but more likely cause an irregularly shaped drywall board remnant 132*a* remaining attached to the support stud 134 by the fastener 136.

Figure 10:
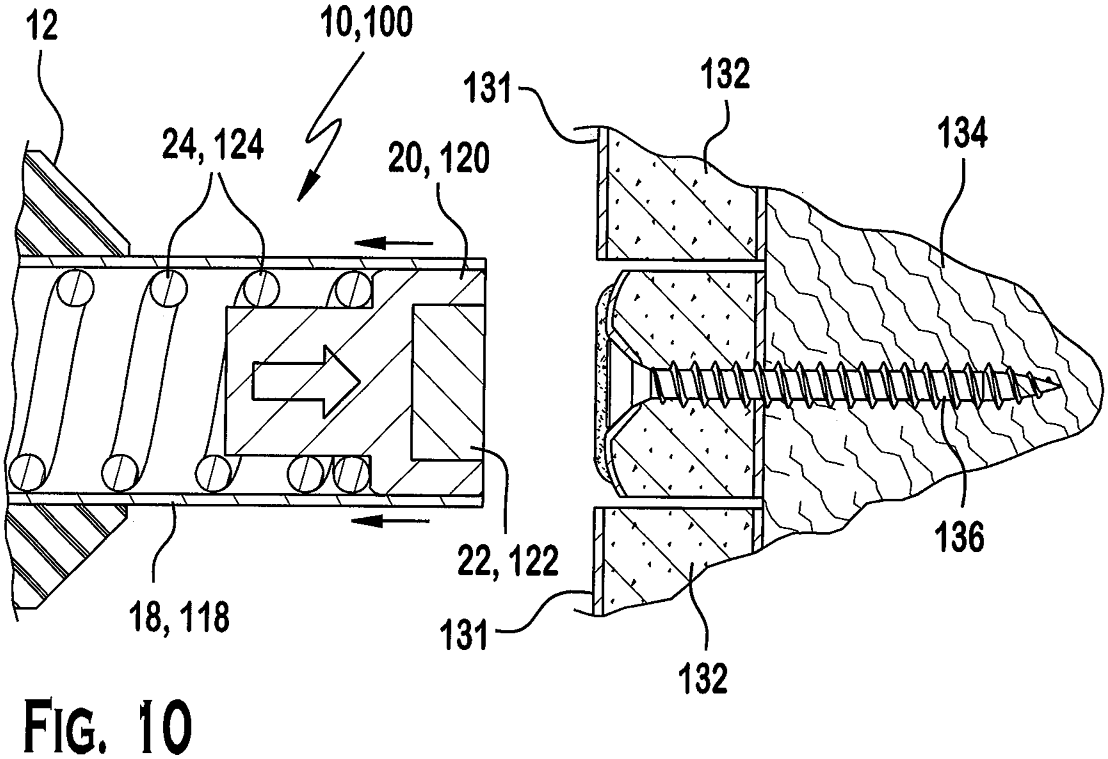
FIG. 10 is a cross-sectional view of the drywall punch of the present invention being removed from the drywall board after having punched through the drywall board.
Figure 11:
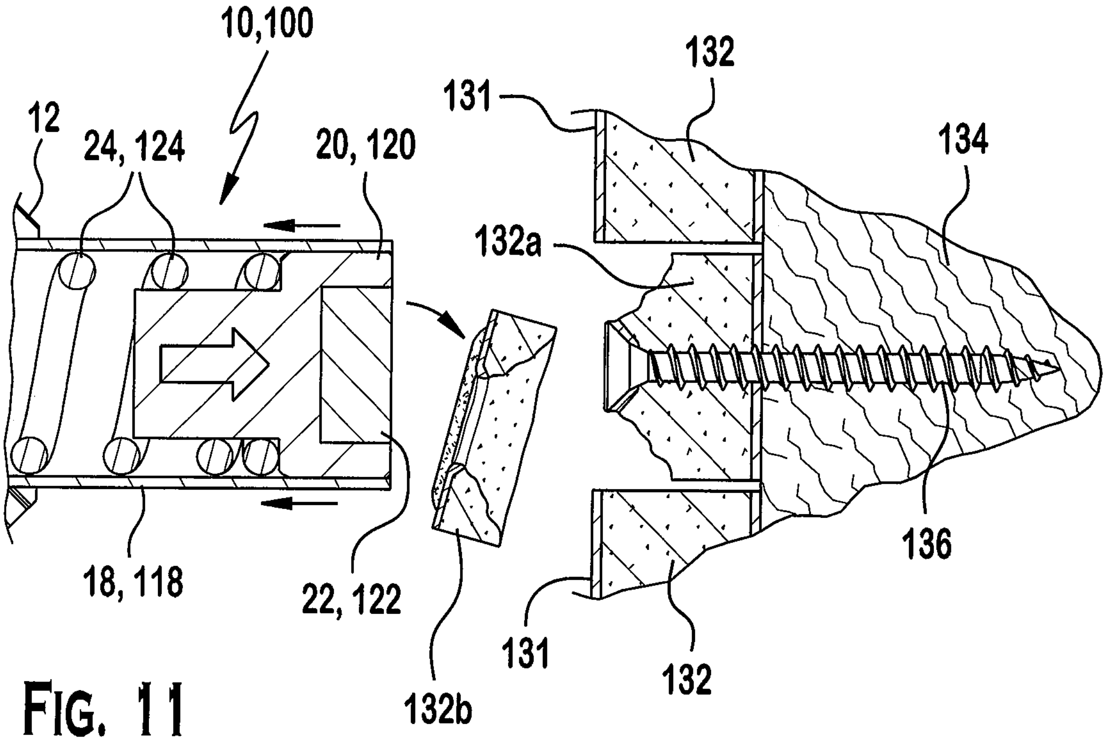
FIG. 11 is a cross-sectional view of the drywall punch of the present invention being removed from the drywall board after having punched through the drywall board with the separated remnant of the drywall board dropping away from the drywall punch.

FIG. 10 shows the drywall punch 10, 110 being withdrawn from the drywall board 132 after the striking action resulting in the cutting of the drywall board surface 131 and the crushing of the remaining drywall material beneath the extended rim of the thin wall tube 18, 118. As the drywall punch 10, 110 is withdrawn (direction of solid arrows), the magnet 22, 122 and the non-magnetic holder 20, 120 are urged back (direction of outline arrow) into their normal position or their rest point with the outer surface 22*a*, 122*a* of the magnet 22, 122 flush with the distal end or rim of the thin wall tube 18, 118. After the drywall punch 10, 110 is withdrawn the remnant 132*a* of the drywall board 132 remains intact fastened to the support stud 134 by the fastener 136. FIG. 11 shows the remnant 132*a* breaking into pieces as the drywall punch 10, 110 is withdrawn from the drywall board 132. The remnant 132*a* may break apart with the outer piece 132*b* falling away from the larger remnant 132*a* as the drywall punch 10, 110 is withdrawn from the drywall board 132. The larger remaining remnant 132*a* remains fastened to the support stud 134 by the fastener 136 for later removal as necessary.

The drywall punch 10 may be gripped by a user with the finger grip 12 and strike shield 14 such that a hammer (not shown) can provide sufficient force to cause the drywall punch 10 to penetrate into the drywall board 132 as described above. This is also the case with the drywall punch 110 and 110*a* where the handle 128 and gripping member 130 may be used to hold the drywall punch 110, 110*a* in position to be struck by a hammer. For a skilled carpenter or drywall installer, the second embodiment of the drywall punch 110, 110*a* may be utilized as a hammer and strike the drywall board 132 independently providing sufficient force for the drywall punch 110, 110*a* to penetrate the drywall board 132 as described above.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A drywall removal tool comprising:

a hollow thin wall cylinder housing a compressible spring having proximal and distal ends, said spring being press fit to a striking cap that is press fit into the proximal end of the thin wall cylinder;

a non-magnetic holder for retaining a cylindrical magnet within one exposed face of the holder is press fit into the distal end of the spring;

the length dimensions of the thin wall cylinder, the striking cap, the spring, the non-magnetic holder and the magnet are such that the striking cap extends outward from the proximal end of the thin wall cylinder and the non-magnetic holder and the magnet fit flush to the distal end of the thin wall cylinder with the spring fitting entirely within the thin wall cylinder;

said magnet is capable of detecting drywall fasteners beneath a drywall sheet outer surface so as to provide a point for striking the drywall sheet to release the drywall sheet from the fastener; and, said spring, non-magnetic holder and magnet are capable of retraction into the thin wall tube when the striking cap is struck by an external force exposing the distal end or rim of the thin wall cylinder for use in penetrating a drywall sheet at the detected point of fastening said sheet to a structural support to separate the drywall sheet from the fastener and underlying drywall sheet material by penetrating through the drywall sheet outer covering and crushing the underlying drywall sheet material creating a hole in the drywall sheet.

2. The drywall punch of claim 1 further comprising a gripping member having proximal and distal ends for manual manipulation of the drywall punch.

3. The drywall punch of claim 2 wherein said thin wall cylinder and striking cap are surrounded by and press fit into said gripping member such that the striking cap extends slightly outward of the proximal end of the gripping member and the thin wall cylinder extends outward from the distal end of the gripping member.

4. The drywall punch of claim 2 further comprising a strike guard positioned at the proximal end of the drywall punch for preventing a user's hand from being struck by a hammer applying the external force to the drywall punch.

5. The drywall punch of claim 2 wherein said gripping member is attached in a perpendicular arrangement to the external wall of the striking cap such that the combination drywall punch and gripping member may be used as a handle to hold the drywall punch in position over the location of a drywall fastener or in a striking fashion similar to a hammer.

6. The drywall punch of claim 2 wherein said thin wall tube is press fit into a cylindrical aperture having a first larger diameter of said gripping member and said spring is aligned within the thin wall tube and press fit into a cylindrical aperture extension having a second smaller diameter of said gripping member.

* * * * *